United States Patent [19]

Kawai et al.

[11] 4,125,899

[45] Nov. 14, 1978

[54] BESSEL FUNCTION TYPE AUTOMATIC DELAY EQUALIZER

[75] Inventors: Kazuo Kawai, Yokohama; Michitoshi Tamori, Tokyo; Hidetaka Yanagidaira, Omiya; Sotokichi Shintani, Mitaka, all of Japan

[73] Assignee: Kokusai Denshin Denwa Co., Ltd., Tokyo, Japan

[21] Appl. No.: 807,671

[22] Filed: Jun. 17, 1977

[30] Foreign Application Priority Data

Jun. 17, 1976 [JP] Japan .................................. 51-70335

[51] Int. Cl.$^2$ .......................... G06F 15/34; H03H 7/16
[52] U.S. Cl. ..................................... 364/724; 325/42; 333/18; 333/28 R; 333/70 T
[58] Field of Search ............... 364/724; 333/18, 28 R, 333/70 T; 325/42; 328/165, 167

[56] References Cited

U.S. PATENT DOCUMENTS

| 3,631,232 | 12/1971 | Perreault et al. ............. 333/70 T X |
| 3,757,221 | 9/1973 | Moehrmann ........................ 325/42 |
| 3,829,798 | 8/1974 | Byram et al. ................. 333/28 R X |
| 4,027,258 | 5/1977 | Perreault et al. ..................... 333/18 |
| 4,041,418 | 8/1977 | Koeth ..................................... 333/18 |

Primary Examiner—Jerry Smith
Attorney, Agent, or Firm—Armstrong, Nikaido, Marmelstein & Kubovcik

[57] ABSTRACT

A Bessel function type automatic delay equalizer comprising a plurality of transversal filters each of which has an independent delay cosine equalization component having a predetermined period, and the superposition of those filters providing the desired characteristics, characterized in that, said equalizer further comprises a Bessel function generator for controlling the tap gain of said transversal filters.

1 Claim, 4 Drawing Figures

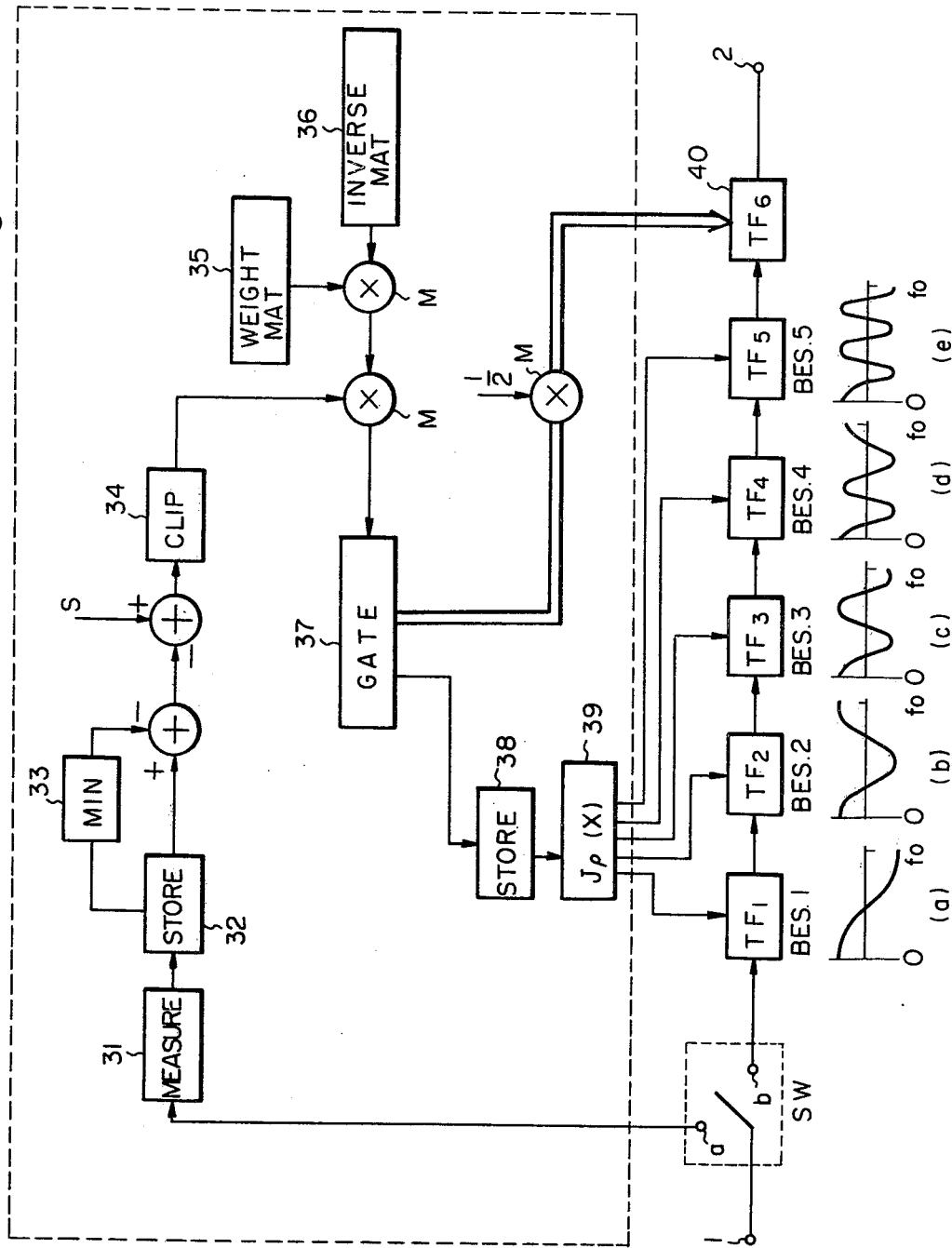

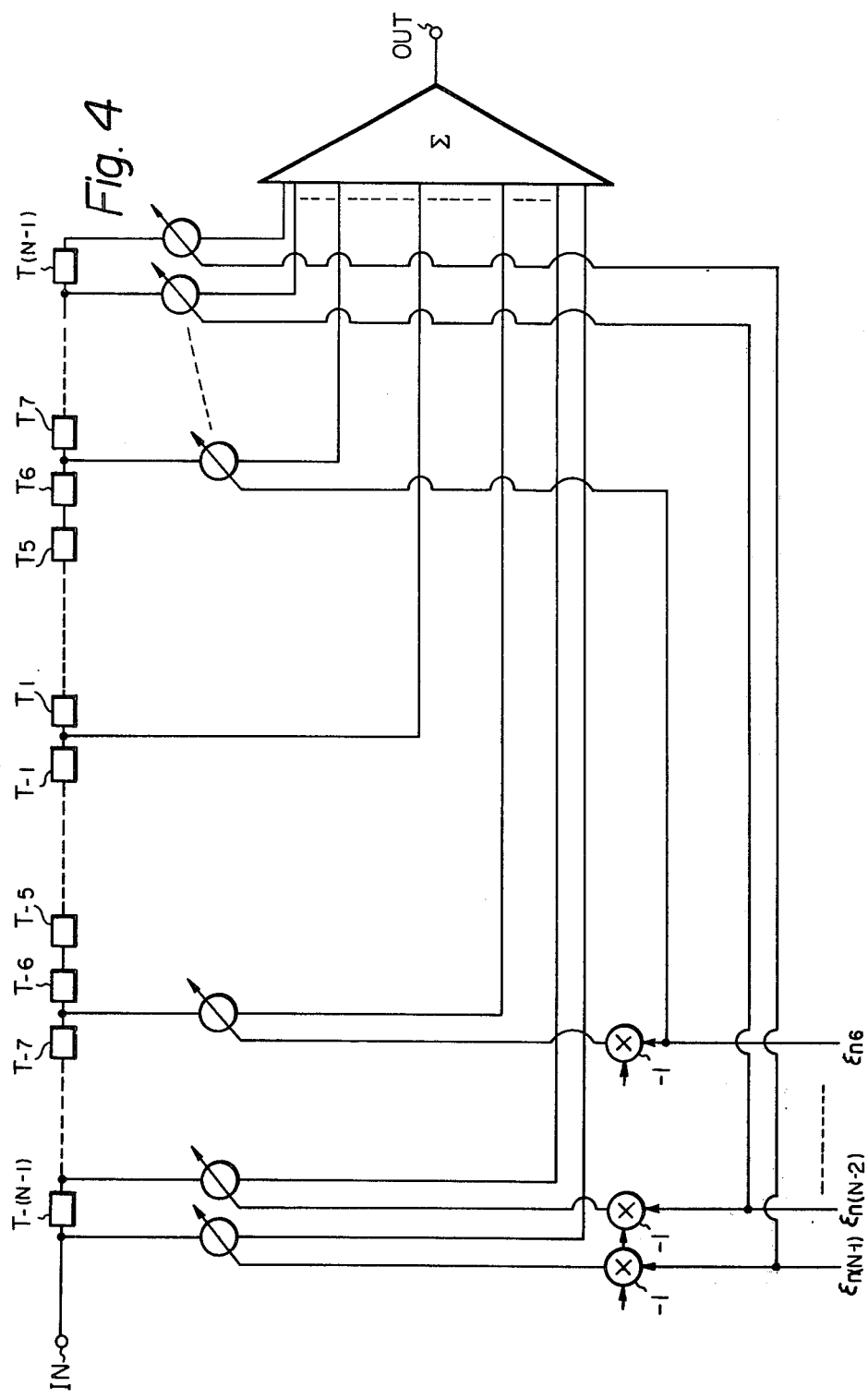

BESSEL FUNCTION TYPE AUTOMATIC DELAY EQUALIZER

BACKGROUND OF THE INVENTION

The present invention relates to an automatic delay equalizer, in particular, relates to an automatic delay equalizer for obtaining the desired equalizing characteristics, using the delay measured on a frequency axis and the amplitude of the cosine component generated in the control unit of the present equalizer.

A prior delay equalizer using a transversal filter adjusts the tap gain either manually or automatically through a complicated control process on a time axis.

However, when the tap gain of the equalizer is adjusted manually, it is difficult to obtain the optimum solution and it takes long time to reach the solution since the tap gain is adjusted just by guessing the quantity of the delay, without measuring the actual delay. And, a prior automatic delay equalizer using the control process on a time axis requires a very complicated control process since the tap gain is defined through the calculation of the correlation function between the input signal and the error.

SUMMARY OF THE INVENTION

It is an object, therefore, of the present invention to overcome the disadvantages and limitations of a prior equalizer by providing a new and improved automatic equalizer.

The above and other objects are attained by an automatic equalizer having a plurality of transversal filters each of which has an independent delay cosine equalization component having a predetermined period, and the superposition of those filters providing the desired characteristics, characterized in that, said equalizer further comprises a Bessel function generator for controlling the tap gain of said transversal filters.

BRIEF DESCRIPTION OF THE DRAWINGS

The foregoing and other objects, features, and attendant aadvantages of the present invention will be appreciated as the same become better understood by means of the following description and the accompanying drawings wherein;

FIG. 3 shows the other embodiment of the automatic equalizer according to the present invention; and FIG. 4 is the block-diagram of the negative pair type transversal filter ($TF_6$) 40 in FIG. 3.

DETAILED DESCRIPTION OF THE PREFERRED EMBODIMENTS

Figure 1:
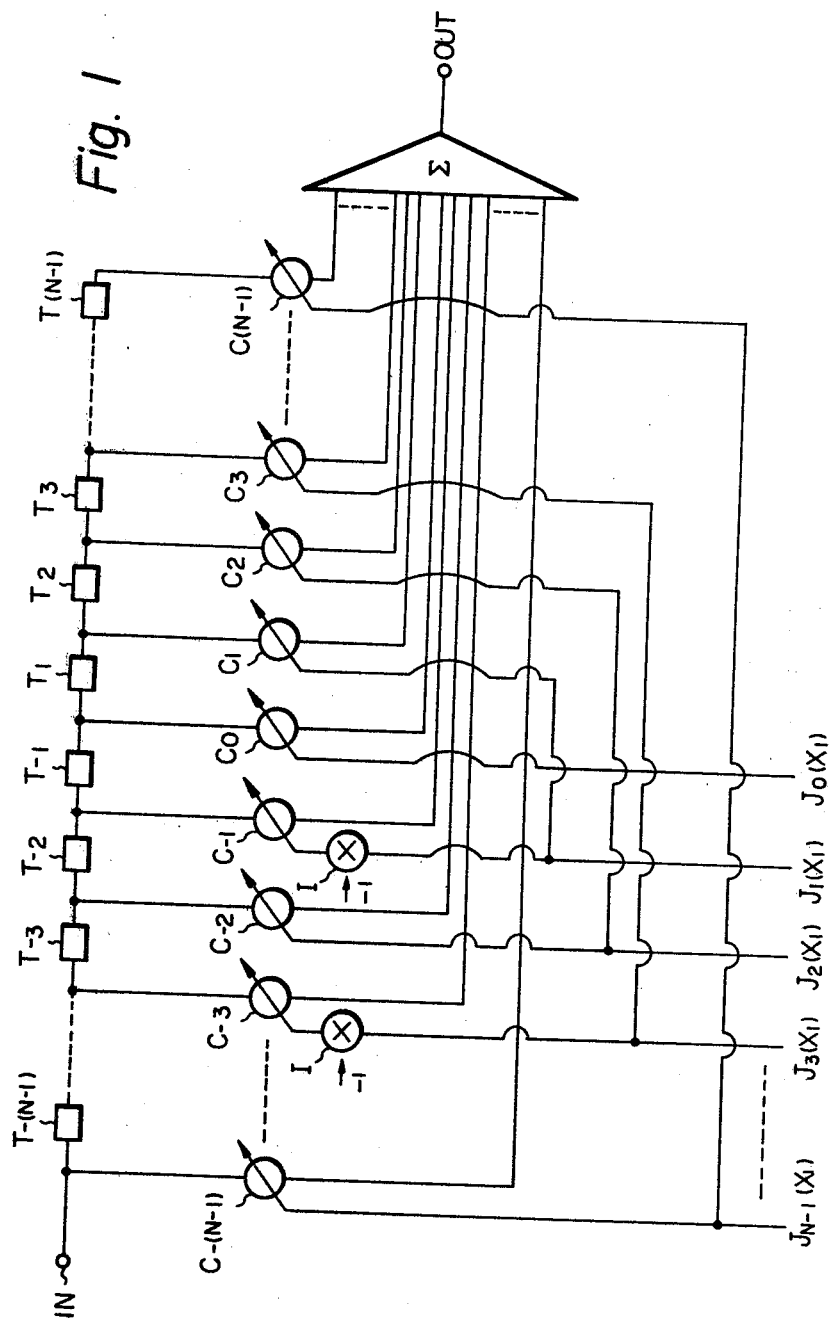
FIG. 1 shows the circuit diagram of the Bessel function type automatic equalizer according to the present invention.
Figure 2:
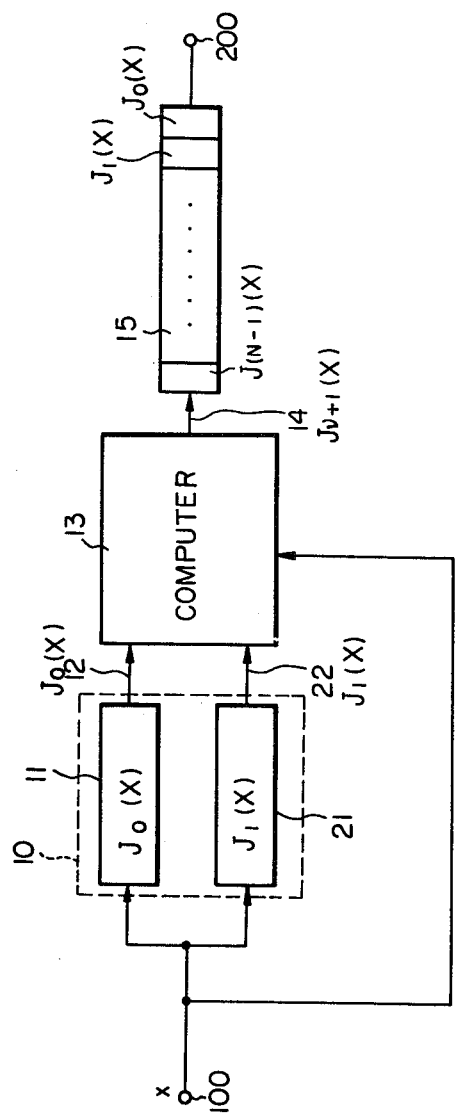
FIG. 2 shows the block-diagram of the Bessel function generator.

FIG. 1 is the circuit-diagram of the automatic equalizer according to the present invention, and FIG. 2 is the block-diagram of the Bessel function generator for the apparatus of FIG. 1. In FIG. 1, $T_{-(N-)},...,T_{-3}, T_{-2}, T_{-1}, T_1, T_2, T_3,..., T_{(N-1)}$ are delay lines each of which has the same delay time $\tau$ and $C_{-(N<1)},..., C_{-3}, C_{-2}, C_{-1}, C_0, C_1, C_2, C_3,..., C_{(N-1)}$ are variable gain circuits each of which is connected to the related tap of the delay line. The input digital signal applied to the input terminal (IN) passes through the train of delay lines $T_{-(N-1)}$ through $T_{(N-1)}$, and the tap outputs of the train of delay lines are applied to the variable gain circuits which control the amplitude of the digital signal. The outputs of the variable gain circuits are added to one another in the adder ($\Sigma$), the output of which appears at the output terminal (OUT) as the output of the present equalizer. The gain of the variable gain circuits are controlled by the Bessel function $J_{N-1}(X_1),..., J_3(X_1), J_2(X_1), J_1(X_1), J_0(X_1)$, applied to the variable gain circuits from the Bessel function generator. The inverter (I) is inserted in the odd variable gain circuits as shown in FIG. 1.

The operation of the apparatus in FIG. 1 is mathematically explained below.

The transfer function of $X_1$ is $$K_1(j\omega) = e^{-jX_1 \sin(\tau\omega)} \qquad (1)$$

$$k_1(j\omega) = J_0(X_1) + 2 \sum_{n=1}^{\infty} J_{2n}(X_1)\cos(2n\tau\omega)$$

$$-j2 \sum_{n=1}^{\infty} J_{2n-1}(X_1) \sin\{(2n-1)\tau\omega\} \qquad (2)$$

The formula (2) can be changed to;

$$k_1(j\omega) = J_0(X_1) + \sum_{n=1}^{\infty} J_{2n}(X_1)e^{-j2n\tau\omega} \qquad (3)$$

$$+ \sum_{n=1}^{\infty} J_{2n-1}(X_1)e^{-j(2n-1)\tau\omega}$$

$$+ \sum_{n=1}^{\infty} J_{2n}(X_1)e^{j2n\tau\omega}$$

$$- \sum_{n=1}^{\infty} J_{2n-1}(X_1)e^{j(2n-1)\tau\omega}$$

The formula (3) shows that the transfer function of the formula (1) can be realized by a transversal filter whose tap gain is defined by the Bessel function, that is to say, $J_0(X_1)$ for the center tap, the positive pair of the Bessel function to the even number of taps, and the negative pair of the Bessel function the odd number of taps. FIG. 1 is, it should be appreciated, the circuit for realizing the formula (3).

From the formula (1), the phase characteristics and the delay characteristics are given by the formulas (4) and (5) respectively.

$$arg K_1(j\omega) = -X_1 \sin(\tau\omega) \qquad (4)$$

The delay characteristics is $$\frac{d(arg K(j\omega))}{d\omega} = X_1 \cos(\tau\omega) \qquad (5)$$

Further, the formula (6) is derived from the formula (2).

$$\frac{d(arg K_1(j\omega))}{d\omega} = \frac{Q}{P}$$

$$Q = \{2 \sum_{n=1}^{\infty} (2n-1) \tau J_{2n-1}(X_1)\cos(2n-1)\tau\omega\}$$

$$\times \{J_0(X_1) + 2 \sum_{n=1}^{\infty} J_{2n}(X_1) \cos(2n \tau\omega)\}$$

-continued $$+ \{2 \sum_{n=1}^{\infty} 2n \tau J_{2n}(X_1) \sin(2n \tau \omega) \quad (6)$$

$$\times \{2 \sum_{n=1}^{\infty} J_{2n-1}(X_1) \sin(2n - 1) \tau \omega\}$$

$$P = \{J_0(X_1) + 2 \sum_{n=1}^{\infty} J_{2n}(X_1) \cos(2n \tau \omega)\}^2$$

$$+ \{2 \sum_{n=1}^{\infty} J_{2n-1}(X_1) \sin(2n - 1)^{\tau \omega}\}^2$$

It should be noted that the formula (6) shows the delay chatacteristics according to the Bessel function, and the formula (6) is equivalent to the formula (5). When an equalizer is composed in accordance with the formula (6) using a transversal filter with (2N−1) taps, the addition in the adder (Σ) in FIG. 1 is performed up to the (N−1)'th term, then the rest of the terms may cause the error in view of the formula (5).

The formula (3) shows that the even terms have a positive coefficient, and the odd terms have a negative coefficient. Therefore, an inverter is inserted in the odd term circuit, and thus the N number of the Bessel function values provide the (2N−1) number of the tap gains.

It should be understood of course that equalization elements having a period of ½, ⅓ or $1/k$ can be realized in a similar manner as described above.

FIG. 1 shows that the whole circuit is a series connection of the transversal filters each of which shares the relating equalization of the delay.

The transfer function of FIG. 1 constructed above is shown in the formula (7) below.

$$K_1(j\omega) = \exp\{-j \sum_{i=1}^{N-1} X_i \cdot \sin(i \tau \omega)\} \quad (7)$$

where $X_i$ is the amplitude of the i'th phase component. The phase characteristics $\theta(\omega)$ and the delay characteristics $T(\omega)$ are shown below.

$$\theta(\omega) = -\sum_{i=1}^{N-1} X_i \cdot \sin(i \tau \omega) \quad (8)$$

$$T(\omega) = \sum_{i=1}^{N-1} X_i \cdot i \cdot \tau \cdot \cos(i \tau \omega) \quad (9)$$

The formula (9) can be changed to the matrix form below, where the sampled values on the frequency axis with the same intervals to one another are denoted $T(\omega_1), T(\omega_2),..., T(\omega_{N-1})$ $$\begin{pmatrix} T(\omega_1) \\ T(\omega_2) \\ \vdots \\ T(\omega_{N-1}) \end{pmatrix} = \begin{pmatrix} \cos\theta & \cos 2\theta & \cdots & \cos(N-1)\theta \\ \cos 2\theta & \cos 4\theta & \cdots & \cos 2(N-1)\theta \\ \vdots & \vdots & & \vdots \\ \cos(N-1)\theta & \cos 2(N-1)\theta & \cos(N-1)^2\theta \end{pmatrix} \begin{pmatrix} \tau & & 0 \\ & 2\tau & \\ & & \ddots \\ 0 & & (N-1)\tau \end{pmatrix} \begin{pmatrix} X_1 \\ X_2 \\ \vdots \\ X_{N-1} \end{pmatrix} \quad (10)$$

The equation (10) is solved as shown in the formula (11), where the cosine matrix has an additional row and column in order that said cosine matrix is a regular matrix. By obtaining the measured value $T(\omega_0), T(\omega_1), T(\omega_2),...,T(\omega_{N-1})$, the value $(X_0, X_1, X_2, ----, X_{N-1})^T$ can be obtained from the formula (11).

$$\begin{pmatrix} X_0 \\ X_1 \\ X_2 \\ \vdots \\ X_{N-1} \end{pmatrix} = \begin{pmatrix} 1/\tau & & & 0 \\ & 1/\tau & & \\ & & 1/2\tau & \\ & & & \ddots \\ 0 & & & 1/(N-1)\tau \end{pmatrix} \begin{pmatrix} 1 & 1 & \cdots & 1 \\ 1 & \cos\theta & \cdots & \cos(N-1)\theta \\ 1 & & \cdots & \cos 2(N-1)\theta \\ \vdots & & & \vdots \\ 1 & \cos(N-1)\theta & \cdots & \cos(N-1)^2\theta \end{pmatrix}^{-1} \begin{pmatrix} T(\omega_0) \\ T(\omega_1) \\ T(\omega_2) \\ \vdots \\ T(\omega_{N-1}) \end{pmatrix} \quad (11)$$

The Bessel function is generated as explained below from the vector $(X_1, X_2,..., X_{N-1})$ which relates to the amplitude of the phase component obtained according to the formula (11), and said Bessel function is applied to the transversal filters.

Generally speaking, the Bessel function is obtained from the following formula.

$$J_\rho(X) = \sum_{k=0}^{\infty} \frac{(-1)^k}{k!(\rho+k)} \left(\frac{X}{2}\right)^{\rho+2k} \quad (12)$$

Further, it should be appreciated that the first and second terms of the formula (12) can provide all of the Bessel function by introducing the following asymptotic formula.

$$J_{\nu+1}(X) = \frac{2\nu}{X} J_\nu(X) - J_{\nu-1}(X) \quad (13)$$

FIG. 2 shows the block-diagram of the Bessel function generator according to the present invention. In the figure, the reference numeral 100 is the input terminal, 10 is the basic component generator for obtaining $\rho=0$, and $\rho=1$ in the formula (13), and has the box 11 for generating $J_0(X)$, and the box 21 for generating $J_1(X)$. 12 is the signal line for $J_0(X)$, 22 is the signal line for $J_1(X)$, 13 is the high-order term generator for generating $\nu=1, \nu=2,...$ from the formula (13), and 14 is the signal line for $J_{84+1}(X)$. 15 is the shift register for storing $J_0(X), J_1(X), J_2(X),..., J_{(N-1)}(X)$.

Although $J_\rho(X)$ in the formula (12) has an infinite number of terms, the circuit 10 is sufficient to calculate a finite number of terms, however, the calculation error, is neglected, since the value of the denominator $K!(\rho+k)!$ increases rapidly according to the increase of the value k, and thus the terms of high-order can be neglected.

FIG. 3 shows the other embodiment of the present equalizer, in which both a plurality of Bessel type equalizers $TF_1$ through $TF_5$ and the conventional negative pair type equalizer $TF_6$ are utilized, thus the structure of the whole circuit of the equalizer is simplified. The reason for this is explained below.

When the voice channel is equalized, the delay information sampled for every 200 $H_z$ interval and the equalization at the sampled points are sufficient for practical purposes. Supposing that the period of the basic equalization is from D.C. to 7200 $H_z$, then the equalization band is 3600 $H_z$ and the number of sampling points is 17. Accordingly, the number of variables $X_k$ of the Bessel function is also 17. In that case, the number of taps required for the transversal filter is at least 35 (17 taps on the negative side and 17 taps on the positive side and a single tap at the zero point), supposing that at least a single tap is used on either the negative or positive side, that tap actually has the function $J_1(X_{17})$, in relation to the generation of the equalization component having the smallest period among the above 17 Bessel functions. A transversal filter is required in each equalization component, thus the number of transversal filters required is seventeen, each having thirty-five taps, that number and taps is, however, too large for practical applications.

It should be appreciated that the negative pair type equalizer is excellent for the equalization of high-order equalization components although the equalization capability of the same is not sufficient for the basic equalization component and the component having one-half of one-third period of the basic component, while the Bessel function type delay equalizer is excellent for all of the equalization components although the number of the taps is too large if the Bessel function type equalizer is applied to the equalization of high-order harmonic components.

When the Bessel function type equalizer is utilized for equalization of the basic component through one-fifth of the period of the same, and the negative pair type equalizer is utilized for the rest of the components, the number of taps required is only 210 as shown below.

$$35 \times 5 + 35 \times 1 = 210$$

However, it should be noted that the equalizer of FIG. 3 can be utilized only when the amplitude $\epsilon_{ni}$ of the phase component is small.

The operation of the equalizer of FIG. 3 is explained below. The input terminal 1 is connected to the contact (a) so long as the pilot signal is transmitted, and thus the input signal is applied to the digital analyzer 31, which stores the measured results measured at the uniform intervals on the frequency axis in the memory 32.

The minimum value detector 33 detects the minimum value among the results stored in the memory 32, and the detected minimum value is subtracted from each value stored in the memory 32. The inverse delay equalization characteristics are obtained by subtracting the difference of said subtraction from the predetermined equalization interval S.

Among the inverse delay equalization characteristics, the negative value is forced to zero by the clip circuit 34, the output of which is $T(\omega_j)$ in the formula (11).

On the other hand, the inverse matrix memory 36 has the inverse matrix of the formula (11), and the weight matrix memory 35 has the inverse matrix concerning $\tau$, and the product of the outputs of the memorys 35 and 36 is multiplied with said $T(\omega_j)$, and the $(X_1, X_2,..., X_{N-1})^T$ is obtained as the product of the multiplication. In the figure, the symbol M shows the multiplier. Among them, $X_1, X_2, X_3, X_4,$ and $X_5$ are stored in the memory 38 through the AND-circuit 37, and the rest of them are applied to the transversal filter 40 as the tap gain of the negative pair.

The value $X_i$ stored in the memory 38 is applied to the $J_\rho(X)$ generator shown in FIG. 2. Said generator 39 applies $J_0(X_1), J_1(X_1), \text{---} J_{(N-1)}(X_1)$ to the transversal filter (BES. 1), applys $J_0(X_2), J_1(X_2)\text{----} J_{(N-1)}(X_2)$ to the transversal filter (BES. 2), and similarly applies $J_0(X_5), J_1(X_5) \text{----} J_{(N-1)}(X_5)$ to the transversal filter (BES. 5). Thus the tap adjustment of those transversal filters is accomplished. After the completion of the tap adjustment, the switch SW is connected to the contact (b), and then the input signal applied to the terminal 1 is equalized by the transversal filters $TF_1$ through $TF_6$ and the equalized signal is provided at the output terminal 2.

FIG. 4 shows the block-diagram of the transversal filter ($TF_6$) 40 in FIG. 3. The elements composing the apparatus of FIG. 4 are exactly the same as those of FIG. 1. However, the apparatus of FIG. 4 has the feature that the tap gain of the center tap is 1 and the tap weight $\epsilon_{n6}, \epsilon_{n7} \text{----} \epsilon_{n17}$ for more than 6'th taps constitutes the negative pair type transversal filter, where $$\epsilon_{ni} = \tfrac{1}{2} X_k.$$

The automatic delay equalizer as mentioned above can realize the transfer function $$K(j\omega) = \exp[-j \sum_{i=1}^{N-1} X_i \sin(i \tau \omega)]$$

and so the equalization capability is excellent.

Further, the number of taps can be reduced with a little compromise of the equalization capability. Further, the combination structure that the Bessel function type equalizer handles the larger value of $X_i$, and the negative pair tap type equalizer handles the smaller value of $X_i$.

It should be appreciated that many modifications of the present embodiments are possible, for instance, the portion enclosed by the dotted line in FIG. 3 can be a separate unit, which is commonly composed of a plurality of delay equalizers, in order to simplify the structure of the equalizer.

From the foregoing it will now be apparent that a new and improved automatic delay equalizer has been found. It should be appreciated of course that the embodiments disclosed are merely illustrative and are not intended to limit the scope of the invention. Reference should be made to the appended claims, therefore, rather than the specification as indicating the scope of the invention.

What is claimed is:

1. A bessel function type automatic delay equalizer comprising
   (a) a plurality of cascaded transversal filters, each having an independent delay cosine equalization component having a predetermined period,
   (b) measuring means for measuring the discrete delay characteristics of a transmission line on the frequency axis using a sweep signal,
   (c) a switch means for alternately connecting the input terminal of the equalizer and the transmission line to be equalized to said transversal filters or to the measuring means of the delay characteristics,
   (d) generating means, coupled to the measuring means, for generating the inverse of the measured delay characteristics,
   (e) inverse matrix memory means,
   (f) weight matrix memory means,
   (g) a first multiplication means, coupled to said inverse matrix memory means and said weight matrix memory means, for obtaining the product of a predetermined inverse matrix concerning the cosine component and a predetermined weight matrix, (h) a second multiplication means, coupled to said first multiplication means and said generating means, for obtaining the product of the output of said first multiplication means and the inverse of the measured delay characteristics, (i) a Bessel function generator for providing the Bessel function of the output of said second multiplication means, (j) means for applying the output of said Bessel function generator to said transversal filters for controlling the tap gain of the transversal filters, (k) a negative pair type transversal filter connected in series to said transversal filters, said negative pair type transversal filter being controlled by the output of said second multiplication means, (l) an output terminal of the equalizer connected to the output of the negative pair type transversal filter.

* * * * *